United States Patent
Nammi

(10) Patent No.: US 10,992,422 B2
(45) Date of Patent: Apr. 27, 2021

(54) FACILITATING UPLINK CONTROL CHANNEL DECODING FOR ADVANCED NETWORKS

(71) Applicant: AT&T Intellectual Property I, L.P., Atlanta, GA (US)

(72) Inventor: SaiRamesh Nammi, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 11 days.

(21) Appl. No.: 16/376,811

(22) Filed: Apr. 5, 2019

(65) Prior Publication Data

US 2020/0067648 A1 Feb. 27, 2020

Related U.S. Application Data

(60) Provisional application No. 62/720,529, filed on Aug. 21, 2018.

(51) Int. Cl.
*H04L 1/16* (2006.01)
*H04L 1/00* (2006.01)
*H04L 1/18* (2006.01)

(52) U.S. Cl.
CPC .......... *H04L 1/1671* (2013.01); *H04L 1/0079* (2013.01); *H04L 1/1812* (2013.01); *H04L 1/1864* (2013.01)

(58) Field of Classification Search
CPC ... H04L 1/1812; H04L 5/0055; H04L 1/1861; H04L 5/0053; H04L 1/1864; H04L 1/1896; H04W 72/04
See application file for complete search history.

(56) References Cited

U.S. PATENT DOCUMENTS

| | | | |
|---|---|---|---|
| 8,670,379 B2 | 3/2014 | Yamada et al. | |
| 8,768,263 B2 | 7/2014 | Malladi et al. | |
| 8,923,223 B2 | 12/2014 | Chen et al. | |
| 9,112,659 B2 | 8/2015 | Zhang et al. | |
| 9,191,326 B2 | 11/2015 | Han et al. | |
| 9,794,919 B2 | 10/2017 | Han et al. | |
| 9,877,309 B2 | 1/2018 | Seo et al. | |

(Continued)

FOREIGN PATENT DOCUMENTS

EP 3 280 086 A1 2/2018

OTHER PUBLICATIONS

International Search Report and Written Opinion received for PCT Application Serial No. PCT/US2019/042851 dated Jan. 7, 2020, 21 pages.

*Primary Examiner* — Asad M Nawaz
*Assistant Examiner* — Najeeb Ansari
(74) *Attorney, Agent, or Firm* — Amin, Turocy & Watson, LLP

(57) ABSTRACT

Facilitating uplink control channel decoding for advanced networks (e.g., 4G, 5G, and beyond) is provided herein. Operations of a system can comprise determining a channel estimate for an uplink control transmission received from a user equipment device via an uplink control channel, wherein the determining is based on a reference signal received from the user equipment device. The operations also can comprise determining a status of an acknowledgement that a data transmission was received by the user equipment device based on the channel estimate and a maximum likelihood estimation function.

18 Claims, 14 Drawing Sheets

(56) References Cited

U.S. PATENT DOCUMENTS

| | | | |
|---|---|---|---|
| 9,949,241 B2 | 4/2018 | Yin et al. | |
| 9,960,896 B2 | 5/2018 | Pan et al. | |
| 2012/0182878 A1 | 7/2012 | Qian | |
| 2013/0265963 A1 | 10/2013 | Suzuki et al. | |
| 2015/0319771 A1* | 11/2015 | Hill | H04W 72/1257 370/330 |
| 2016/0270066 A1 | 9/2016 | Seo et al. | |
| 2016/0380740 A1 | 12/2016 | Yum et al. | |
| 2017/0215201 A1* | 7/2017 | Kim | H04L 1/1812 |
| 2017/0338911 A1 | 11/2017 | You et al. | |
| 2017/0366311 A1 | 12/2017 | Iyer et al. | |
| 2018/0227908 A1 | 8/2018 | Wang et al. | |
| 2018/0249458 A1 | 8/2018 | He et al. | |
| 2018/0279295 A1 | 9/2018 | Gao et al. | |
| 2018/0316464 A1* | 11/2018 | Stern-Berkowitz | H04L 1/1692 |
| 2019/0320453 A1* | 10/2019 | Hosseini | H04L 5/0023 |
| 2020/0052760 A1* | 2/2020 | Nammi | H04L 1/0031 |
| 2020/0077432 A1* | 3/2020 | Xiong | H04L 1/1825 |

\* cited by examiner

FACILITATING UPLINK CONTROL CHANNEL DECODING FOR ADVANCED NETWORKS

CROSS-REFERENCE TO RELATED APPLICATIONS

This application claims the benefit of U.S. Provisional Application Ser. No. 62/720,529, filed Aug. 21, 2018, and entitled "DECODING UPLINK CONTROL CHANNELS FOR 5G SYSTEMS," the entirety of which is expressly incorporated herein by reference.

TECHNICAL FIELD

This disclosure relates generally to the field of mobile communication and, more specifically, to decoding uplink control channels in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
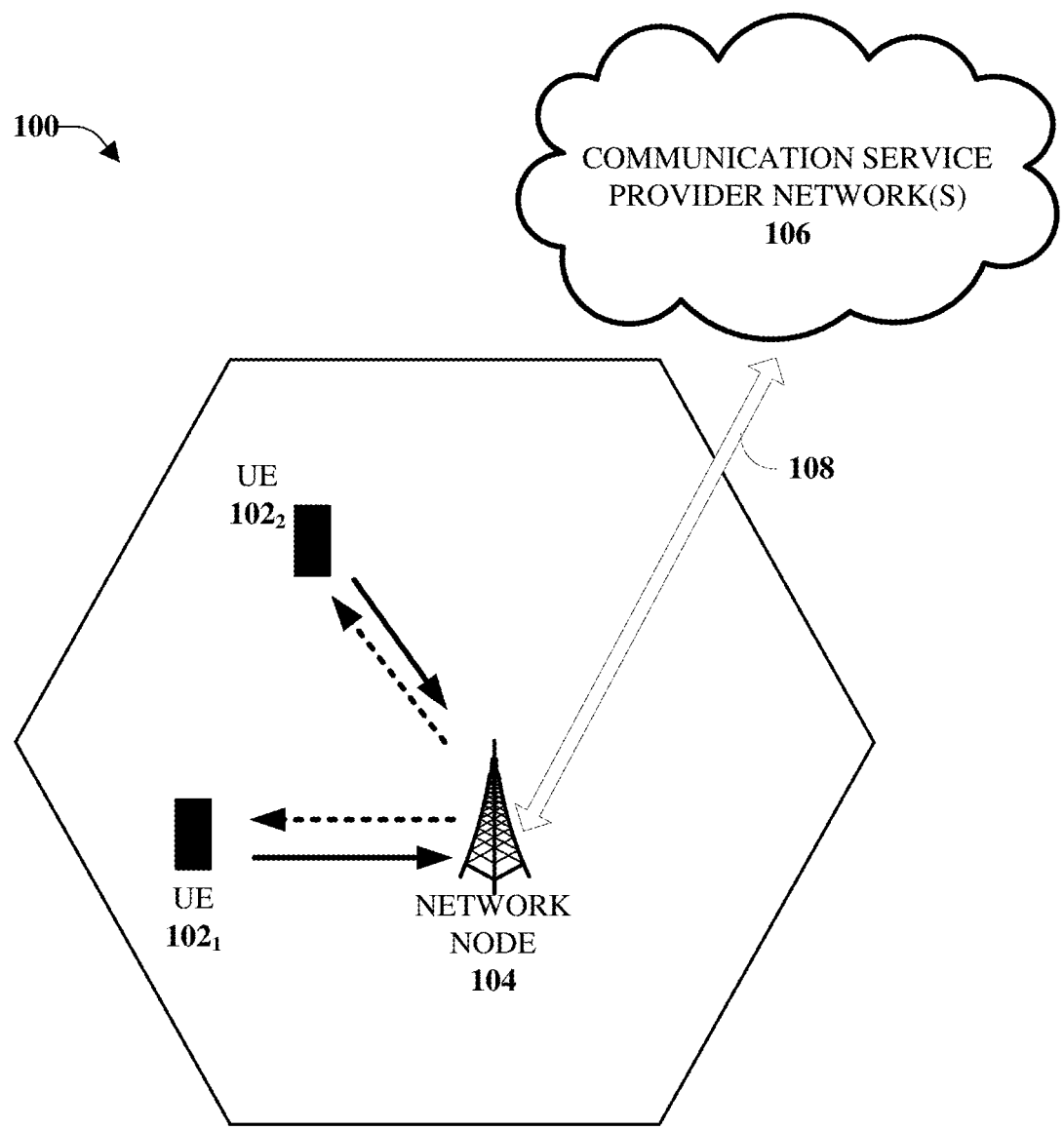
FIG. 1 illustrates an example, non-limiting, wireless communication system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate decoding uplink control channels for advanced networks. To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a ($N_t$,$N_r$) system, where $N_t$ denotes the number of transmit antennas and $N_r$ denotes the receive antennas, the peak data rate multiplies with a factor of $N_t$ over single antenna systems in rich scattering environment.

According to an embodiment, provided is a network node device that can comprise a processor and a memory that stores executable instructions that, when executed by the processor, facilitate performance of operations. The operations can comprise determining a channel estimate for an uplink control transmission received from a user equipment device via an uplink control channel. The determination can be based on a reference signal received from the user equipment device. The operations also can comprise determining a status of an acknowledgement that a data transmission was received by the user equipment device based on the channel estimate and a maximum likelihood estimation function.

According to an implementation, a first resource block comprising the reference signal can be within a predetermined distance from a second resource block associated with a symbol of the uplink control transmission. Further to this implementation, the operations can comprise interpolating the channel estimate to the second resource block associated with the symbol.

Determining the status of the acknowledgement can comprise, according to some implementations, determining a hybrid automatic repeat request acknowledgement was received from the user equipment device. In another example, determining the status of the acknowledgement can comprise determining a hybrid automatic repeat request non-acknowledgement was received from the user equipment device.

The reference signal can be associated with an estimation of channel state information associated with the data transmission to the user equipment device. In another example, the reference signal can be associated with data demodulation.

In accordance with an implementation, the uplink control transmission can conform to a physical uplink control channel transmission format that facilitates user equipment device multiplexing in a physical resource block and is based on a sequence selection. According to some implementations, the uplink control channel can comprise an uplink control channel configured to operate according to a fifth generation wireless network communication protocol.

Another embodiment can relate to a method that can comprise determining, by a mobile device comprising a processor, that a data transmission received from a network node device was received successfully. The method can also comprise transmitting, by the mobile device, an acknowledgement that the data transmission was received in an uplink transmission. The acknowledgement can be associated with a symbol in a first resource block of the uplink transmission. Further, the method can comprise transmitting, by the mobile device, a reference signal in a second resource block of the uplink transmission. The second resource block can be within a predetermined time and frequency domain proximity to the first resource block.

According to some implementations, the method can comprise, prior to determining that the data transmission was received successfully, receiving, by the mobile device, a physical downlink shared channel from the network node device. Further, the method can comprise determining, by the mobile device, a hybrid automatic repeat request acknowledgement, from the physical downlink shared channel. The method also can comprise applying, by the mobile device, a recommended uplink control channel format setting and a reference signal setting indicated in the physical downlink shared channel received from the network node device.

In accordance with an implementation, the reference signal can be a sounding reference signal. According to another implementation, the reference signal can be a demodulation reference signal. The acknowledgement can be an encoded sequence according to some implementations.

The uplink transmission can conform to a physical uplink control channel transmission format that facilitates device multiplexing in a physical resource block and is based on sequence selection according to some implementations. Further, in some implementations, transmitting the reference signal can comprise transmitting the reference signal in an uplink control channel configured to operate according to a fifth generation wireless network communication protocol.

Another embodiment can relate to a machine-readable storage medium, comprising executable instructions that, when executed by a processor, facilitate performance of operations. The operations can comprise determining a hybrid automatic repeat request acknowledgement based on a physical downlink shared channel received from a network device. The operations also can comprise applying a recommended physical uplink control channel format setting and a reference signal setting based on the physical downlink shared channel received from the network device. Further, in some implementations, the operations can comprise transmitting uplink control information using the recommended physical uplink control channel format setting and the reference signal setting.

According to some implementations, the reference signal setting can comprise a sounding reference signal. In some implementations, the reference signal setting can comprise a demodulation reference signal.

In accordance with some implementations, transmitting the uplink control information can comprise transmitting an uplink transmission that conforms to a physical uplink control channel transmission format that facilitates device multiplexing in a physical resource block and is based on sequence selection.

It is noted that the various embodiments are described in particular for NR. The various embodiments are however applicable to any RAT or multi-RAT system where the UE operates using multiple carriers (e.g. LTE FDD/TDD, GSM/GERAN, Wi Fi, WLAN, WiMax, CDMA2000, and so on).

The embodiments are applicable to single carrier as well as to multicarrier (MC) or carrier aggregation (CA) operation of the UE. The term carrier aggregation (CA) is also called (e.g. interchangeably called) "multi-carrier system," "multi-cell operation", "multi-carrier operation", "multi-carrier" transmission and/or reception.

Further, it is noted that the various aspects discussed herein equally apply for Multi RAB (radio bearers) on some carriers (that is data plus speech is simultaneously scheduled).

Referring initially to FIG. 1, illustrated is an example, non-limiting, wireless communication system 100 in accordance with one or more embodiments described herein. According to various embodiments, the wireless communication system 100 can comprise one or more User Equipment devices (UEs), illustrated as a first UE $102_1$ and a second UE $102_2$. It is noted that although only two UEs are illustrated for purposes of simplicity, the wireless communication system 100 can comprise a multitude of UEs.

The non-limiting term user equipment can refer to any type of device that can communicate with a network node in a cellular or mobile communication system. A UE can comprise one or more antenna panels having vertical and horizontal elements. UEs can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. Other examples of UEs comprise, but are not limited to, a target device, device to device (D2D), machine type UE or UE capable of machine to machine (M2M) communications, personal digital assistant (PDA), tablet, mobile terminals, laptop mounted equipment (LME), universal serial bus (USB) dongles enabled for mobile communications, a computer having mobile capabilities, a mobile device such as cellular phone, a laptop having laptop embedded equipment (LEE), such as a mobile broadband adapter, a tablet computer having a mobile broadband adapter, and the like. User equipment (e.g., the first UE $102_1$, the second UE $102_2$) can also comprise Internet of Things (IOT) devices that can communicate wirelessly. UEs can roughly correspond to the mobile station (MS) in Global System for Mobile communications (GSM) systems.

In various embodiments, the wireless communication system 100 is, or can comprise, a wireless communication network serviced by one or more wireless communication network providers. In example embodiments, a UE (e.g., the first UE $102_1$, the second UE $102_2$) can be communicatively coupled to the wireless communication network via a network node device 104. The network node (e.g., network node device) can communicate with the UEs, thus providing connectivity between the UEs and the wider cellular network. Further, the network node device 104 can facilitate wireless communication between the UEs and the wireless communication network (e.g., one or more communication service provider networks 106) via the network node device 104. In example embodiments, the UEs (e.g., the first UE $102_1$, the second UE $102_2$) can send and/or receive communication data via a wireless link to the network node device 104. The dashed arrow lines from the network node device 104 to the UEs (e.g., the first UE $102_1$, the second UE $102_2$) represent downlink (DL) communications and the solid arrow lines from the UE (e.g., the first UE $102_1$, the second UE $102_2$) to the network nodes (e.g., the network node device 104) represents uplink (UL) communications.

The wireless communication system 100 can further comprise one or more communication service provider networks 106 that can facilitate providing wireless communication services to various UEs, (e.g., the first UE $102_1$, the second UE $102_2$), via the network node device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks, Wi-Fi service networks, broadband service networks, enterprise networks, cloud based networks, and the like.

The non-limiting term network node (e.g., network node device) can be used herein to refer to any type of network node serving one or more UEs and/or connected to other network nodes, network elements, other nodes, and/or other devices from which one or more UEs can receive a radio signal. In cellular radio access networks (e.g., Universal Mobile Telecommunications System (UMTS) networks), a network node can be referred to as Base Transceiver Stations (BTS), radio base station, radio network nodes, base stations, Node B, eNode B (e.g., evolved Node B), and so on. In 5G terminology, the node can be referred to as a gNode B (e.g., gNB) device.

Network nodes can also comprise multiple antennas for performing various transmission operations (e.g., Multiple Input, Multiple Output (MIMO) operations). A network node can comprise a cabinet and other protected enclosures, an antenna mast, and actual antennas. Network nodes can serve several cells, also called sectors, depending on the configuration and type of antenna. Examples of network nodes (e.g., network node device 104) can comprise but are not limited to: Node B devices, Base Station (BS) devices, Access Point (AP) devices, and Radio Access Network (RAN) devices. The network node device 104 can also comprise Multi-Standard Radio (MSR) radio node devices, comprising: an MSR BS, an eNode B, a network controller, a Radio Network Controller (RNC), a Base Station Controller (BSC), a relay, a donor node controlling relay, a Base Transceiver Station (BTS), a transmission point, a transmission node, a Remote Radio Unit (RRU), a Remote Radio Head (RRH), nodes in distributed antenna system (DAS), and the like.

For example, in at least one implementation, the wireless communication system 100 can be, or can include, a large scale wireless communication network that spans various geographic areas. According to this implementation, the one or more communication service provider networks 106 can be, or can include, the wireless communication network and/or various additional devices and components of the wireless communication network (e.g., additional network devices and cell, additional UEs, network server devices, etc.).

The network node device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation modes to facilitate wireless radio communications between devices (e.g., the UEs (e.g., the first UE $102_1$, the second UE $102_2$) and the network node device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000, and so on.

For example, the wireless communication system 100 can operate in accordance with Global System for Mobile Communications (GSM), Universal Mobile Telecommunications Service (UMTS), Long Term Evolution (LTE), LIE frequency division duplexing (LTE FDD), LIE Time Division Duplexing (TDD), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-Carrier Code Division Multiple Access (MC-CDMA), Single-Carrier Code Division Multiple Access (SC-CDMA), Single-Carrier FDMA (SC-FDMA), Orthogonal Frequency Division Multiplexing (OFDM), Discrete Fourier Transform Spread OFDM (DFT-spread OFDM) Single Carrier FDMA (SC-FDMA), Filter Bank Based Multi-Carrier (FBMC), Zero Tail DFT-spread-OFDM (ZT DFT-s-OFDM), Generalized Frequency Division Multiplexing (GFDM), Fixed Mobile Convergence (FMC), Universal Fixed Mobile Convergence (UFMC), Unique Word OFDM (UW-OFDM), Unique Word DFT-spread OFDM (UW DFT-Spread-OFDM), Cyclic Prefix OFDM CP-OFDM, resource-block-filtered OFDM, Wi Fi, WLAN, WiMax, and the like.

However, various features and functionalities of the wireless communication system 100 are particularly described wherein the devices (e.g., the UEs (e.g., the first UE 102$_1$, the second UE 102$_2$) and the network node device 104) of the wireless communication system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to MultiCarrier (MC) or Carrier Aggregation (CA) operation of the UE. The term carrier aggregation is also called (e.g. interchangeably called) "multi-carrier system," "multi-cell operation," "multi-carrier operation," "multi-carrier" transmission and/or reception. Note that some embodiments are also applicable for Multi RAB (radio bearers) on some carriers (that is data plus speech is simultaneously scheduled).

In various embodiments, the wireless communication system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

A challenge faced by mobile communications networks is the increased demand on data rate, throughput, and capacity. With an increasing demand for more data higher speeds, due to application design and service platform, network operators struggle to provide adequate data rates while using traditional mobile network technology (e.g., 3G and 4G). In an effort to meet these increasing demands, the mobile industry has been considering higher frequency bands where the availability of large swaths of un-used spectrum is available.

While these new spectrum bands in higher frequency can hold the promise of more spectrum, the new spectrum bands also come with significant challenges and hurdles. An issue is the poorer propagation that the radio waves experience in these high frequency bands. It is noted that the propagation loss depends on the frequency with a 20 log 10(F) dependency. This implies that for every two times (2×) increase in the carrier frequency, there is a 6 dB increase in the propagation loss.

With more adverse propagation conditions, it is usually the UL that starts to become a challenge since the total transmit power is limited at the UE. Traditional UEs can have a total of 23 dBm (200 mWatts) and with improved UL waveform design and improved technology, it is expected that with 5G it could be possible to push this power to around 26-27 dBm (400-500 mWatts). However, this increase in power is not going to be nearly enough to meet with the adversity of the propagation conditions in higher frequency bands.

Therefore, apart from higher power the mobile industry is also exploring other techniques especially related to new physical layer design and advanced receiver designs to overcome the propagation hurdles in high frequency bands.

A channel that should be preserved in the UL is the control channel, also referred to as Physical Uplink Control Channel (PUCCH). The PUCCH carries various information such as the Hybrid Automatic Repeat Request Acknowledgement/Non-Acknowledgement (HARQ ACK/NACK) related to the DL transmission, CSI (channel state information) such as CQI, PMI, RI, CRI, and so on. Without the UL control channel, there is no way for the system to maintain any DL or UL data bearers, which is why often the PUCCH is designed to be robust.

Figure 2:
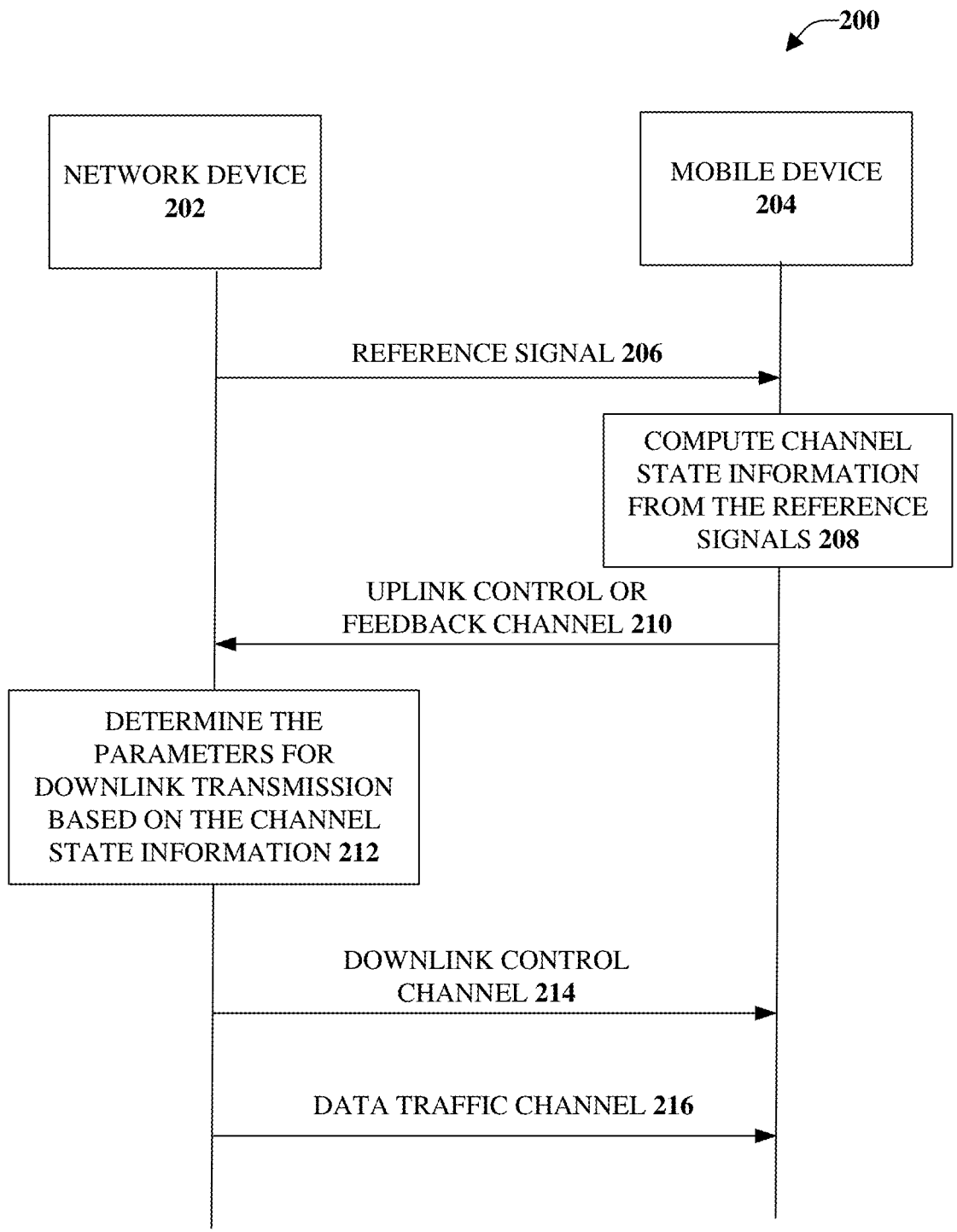
FIG. 2 illustrates an example, non-limiting, message sequence flow chart that can facilitate downlink data transfer in accordance with one or more embodiments described herein.

FIG. 2 illustrates an example, non-limiting, message sequence flow chart 200 that can facilitate downlink data transfer in accordance with one or more embodiments described herein. The message sequence flow chart 200 can be utilized for new radio, as discussed herein. As illustrated, the message sequence flow chart 200 represents the message sequence between a network device 202 (e.g., a gNB) and a mobile device 204. As used herein, the term "network device 202" can be interchangeable with (or can include) a network, a network controller or any number of other network components. One or more pilot signals and/or reference signals 206 can be transmitted from the network device 202 to the mobile device 204. The one or more pilot signals and/or reference signals 206 can be cell specific and/or user equipment specific signals. The one or more pilot signals and/or reference signals 206 can be beamformed or non-beamformed.

Based on the one or more pilot signals and/or reference signals 206, the mobile device 204 can compute the channel estimates and can compute the one or more parameters needed for Channel State Information (CSI) reporting, as indicated at 208. The CSI report can comprise, for example, Channel Quality Indicator (CQI), Precoding Matrix Index (PMI), Rank Information (RI), Channel State Information Reference Signal (CSI-RS) Resource Indicator (CRI the same as beam indicator), and so on, or any number of other types of information.

The CSI report can be sent from the mobile device 204 to the network device 202 via a feedback channel (e.g., an uplink control or feedback channel 210). The CSI report can be sent based on a request from the network device 202, a-periodically, and/or the mobile device 204 can be configured to report periodically or at another interval.

The network device 202, which can comprise a scheduler (e.g., a scheduler component), can use the CSI report for choosing the parameters for scheduling of the mobile device 204 (e.g., a particular mobile device). For example, as indicated at 212, the network device 202 can choose the parameters for downlink transmission based on the channel state information. The parameters for downlink transmission can include, but are not limited to: Modulation and Coding Scheme (MCS), power, Physical Resource Blocks (PRBs), and so on.

The network device 202 can send the scheduling parameters to the mobile device 204 via a downlink control channel (e.g., a downlink control channel 214). Upon or after the scheduling parameter information is transmitted, the actual data transfer can take place from the network device 202 to the mobile device 204 over a data traffic channel (e.g., data traffic channel 216).

Downlink reference signals are predefined signals occupying specific resource elements within the downlink time-frequency grid. There are several types of downlink reference signals that are transmitted in different ways and used for different purposes by the receiving terminal (e.g., the mobile device 204). For example, downlink reference signals can include CSI reference signals (CSI-RS) and/or demodulation reference signals (DM-RS).

CSI reference signals are specifically intended to be used by terminals (e.g., the mobile device 204) to acquire channel-state information (CSI) and beam specific information (beam RSRP). In 5G, for example, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

Other than the above-mentioned reference signals, there are other reference signals, namely phase tracking and tracking and sounding reference signals, which can be used for various purposes.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), Layer Indicator, and so on. The CSI can be divided into at least two categories. For example, a first category can be for subband and a second category can be for wideband. The configuration of subband and/or wideband CSI reporting can be performed through Radio Resource Control (RRC) signaling as part of CSI reporting configuration.

NR defines about five PUCCH formats for reporting HARQ-ACK, SR, and CSI. Table 1 below summarizes the characteristics of each PUCCH format.

TABLE 1

| Format Name | Alternative name | Symbol length | Waveform | Information | Single UE/ Multiple UE |
|---|---|---|---|---|---|
| Format 0 | Short PUCCH <= 2 bits | 1-2 | CP-OFDM | HARQ-ACK, SR | Single UE |
| Format 1 | Long PUCCH <= 2 bits | 4-14 | CP-OFDM | HARQ-ACK, SR | Single UE |
| Format 2 | Short PUCCH > 2 bits | 1-2 | CP-OFDM | CSI | Single UE |
| Format 3 | Long PUCCH > 2 bits | 4-14 | DFT-s-OFDM | CSI | Single UE |
| Format 4 | Long PUCCH > 2 bits | 4-14 | DFT-s-OFDM | CSI | Multiple UEs |

As indicated in Table 1, formats 1 and 2 only are used for sending HARQ-ACK. Long PUCCH formats are used for HARQ-ACK, CSI. The various aspects are discussed with respect to PUCCH format 0. Format 0 is a short PUCCH of one to two (1-2) symbols in length, has a waveform of CP-OFDM, carries HARQ-ACK/NACK and SR, and is for a single UE.

For sending HARQ-ACK using PUCCH format 0, the UE transmits one of the Constant Amplitude Zero AutoCorrelation waveform (CAZAC) sequence in the 3GPP specification for transmitting HARQ-ACK and another sequence for transmitting HARQ-NAK. Traditional receivers use correlation between these sequences and determine whether the UE transmitted HARQ-ACK or HARQ-NAK for the corresponding Physical Downlink Shared Channel (PDSCH) transmission. However, for format 0, the number of OFDM symbols are 1 or 2 and, since only sequences are used, the transmitter does not need to transmit reference signals for detecting the HARQ-ACK/HARQ-NACK.

Figure 3:
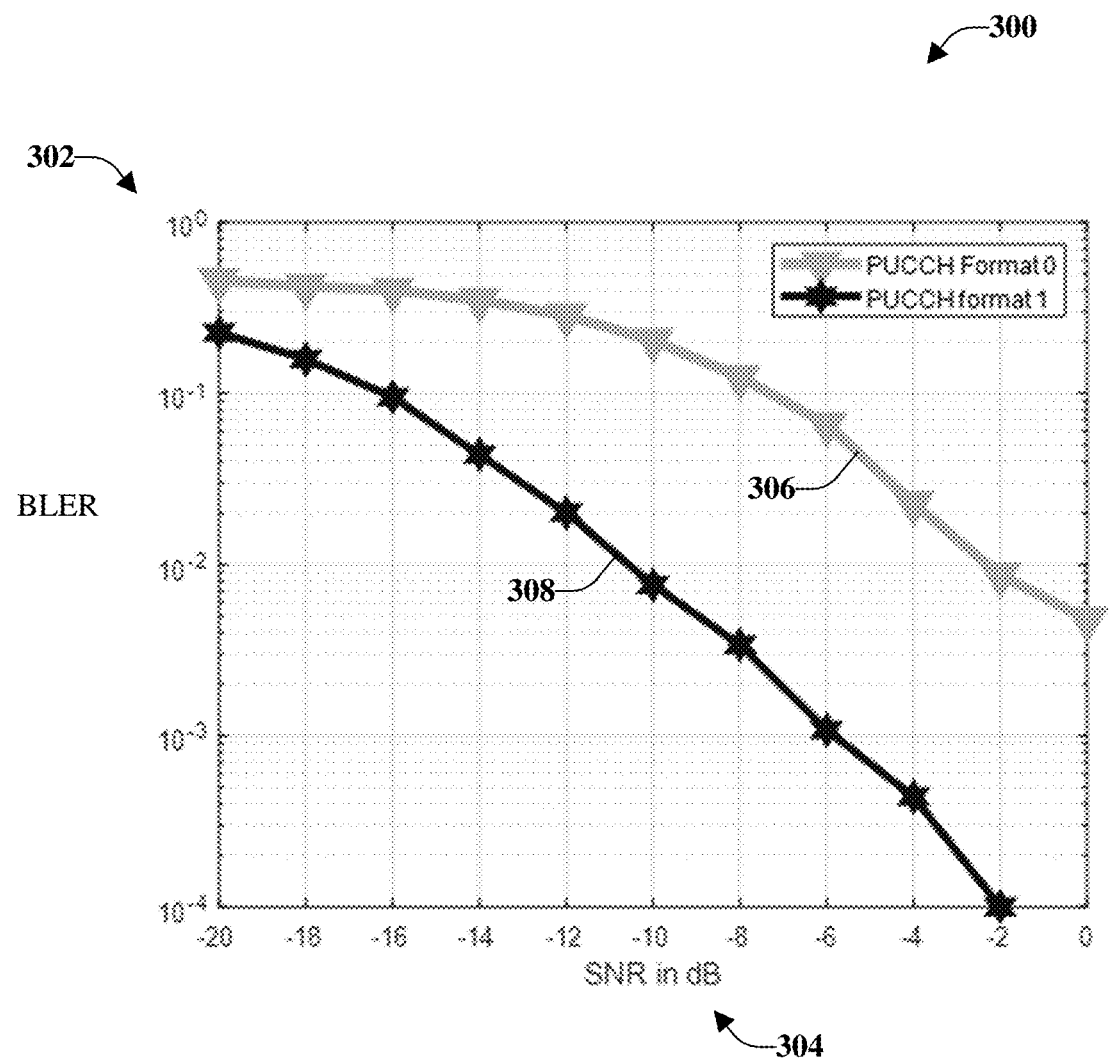
FIG. 3 illustrates an example, non-limiting chart of block error rate comparison between physical uplink control channel format 0 and format 1.

FIG. 3 illustrates an example, non-limiting chart of Block Error Rate (BLER) comparison between PUCCH format 0 and format 1. Illustrated on the vertical axis 302 is BLER, and on the horizontal axis 304 is SNR in decibels (dBs). As illustrated in FIG. 3, the performance of PUCCH format 0 (represented by plot 306) is inferior to PUCCH format 1 (represented by plot 308). This performance is also worse as compared to LTE PUCCH performance. For this and other purposes, the disclosed aspects provide an efficient solution to improve the performance for format 0.

As discussed herein, provided is a system, method, and other embodiments and/or implementations for improving the performance of PUCCH format 0. For example, performance of PUCCH format 0 can be improved by using a reference signal (which was configured for CSI estimation of PUSCH or data demodulation for PUSCH/PUCCH (Format1-4)) to estimate the channel on the PUCCH format-0 resources and to use coherent detection of HARQ-ACK/NAK bits. According to an embodiment, the network (e.g., a network device) can schedule a reference signal in those resource blocks which are close to the resource blocks of the actual PUCCH transmission. Upon or after the UE transmits the reference signal close to that of the PUCCH transmission in terms of RBs, the receiver at the network node device can estimate the channel on those resource blocks and interpolates to that of the resources in the PUCCH transmission. Upon or after the network node device estimates the channel, the network node device can use coherent detection to determine the HARQ-ACK or HARQ-NACK.

The various aspects provided herein can allow for better detection capability for uplink control channel as compared to traditional systems. Accordingly, the disclosed aspects can achieve significant gain in block error rate for PUCCH format 0. This in turn can improve the NR coverage, which can allow for a robust performance of the UL control channel even at low SINR conditions.

A principle of the disclosed aspects is the signaling of the reference signal resources close to that of PUCCH format 0 resources such that the network (e.g., at least one network device) can use channel estimation from the reference signals and use interpolation for estimating the channel for the PUCCH resources.

Figure 4:
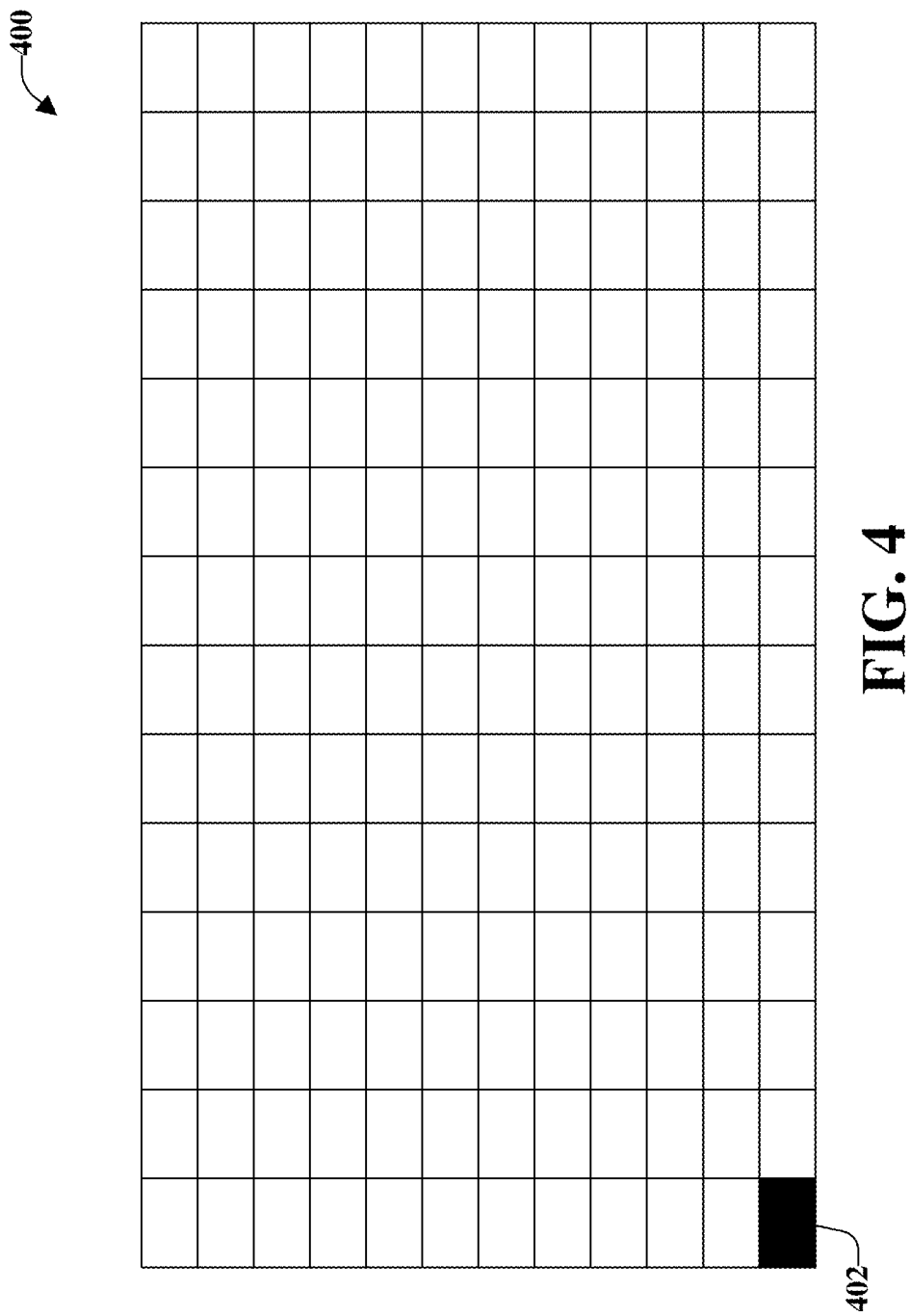
FIG. 4 illustrates an example, non-limiting, representation of resource mapping for physical uplink control channel resources.

FIG. 4 illustrates an example, non-limiting, representation of resource mapping for PUCCH resources. For example, the PUCCH resources can be equal to one RB, which can be equal to twelve sub carriers.

In further detail, FIG. 4 illustrates PUCCH format 0 resources for the configured bandwidth part. It is noted that only one symbol (e.g., symbol 402) is depicted, however, in general it can be either 1 or 2 symbols. Therefore, whenever the UE decodes the PDSCH and, if the CRC is a failure, the UE can send a CAZAC sequence corresponding to the HARQ-NAK. Alternatively, when the CRC passes, the UE can send the CAZAC sequence corresponding to the HARQ-ACK. Without any enhancement, the network can use correlation receiver and can detect whether the UE sent HARQ-ACK or HARQ-NAK.

According to some implementations, there is no need for any reference signal for transmitting PUCCH format 0. However, it has been observed that the UE has to send reference signal for different purposes such as sounding reference signal for PUSCH transmission, DMRS for PUSCH demodulation, and so on. Similarly, the UE has to send other PUCCH formats that use reference signals.

Figure 5:
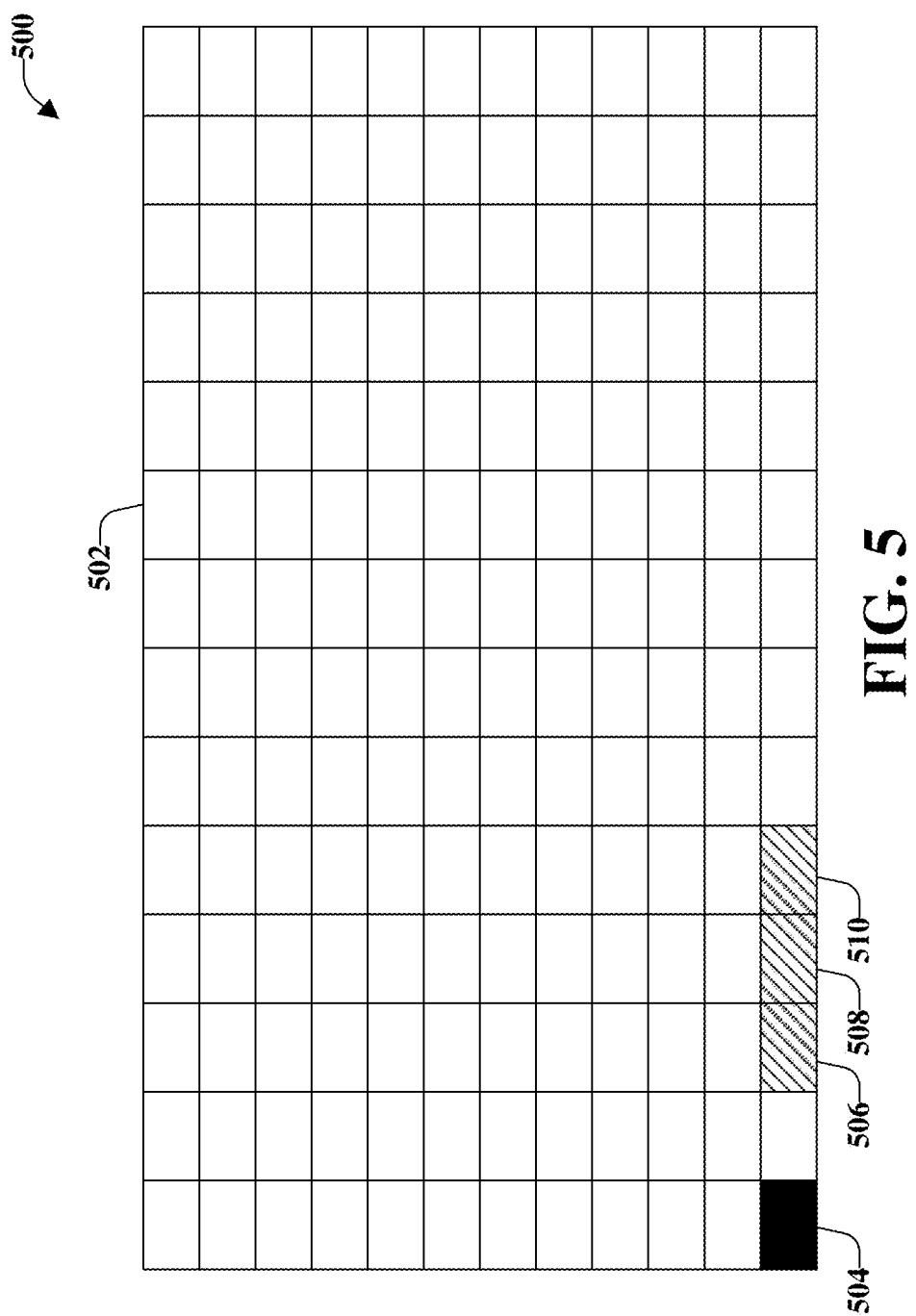
FIG. 5 illustrates an example, non-limiting, representation of resource mapping for physical uplink control channel resources along with reference signal.

For purposes of explanation, FIG. 5 illustrates an example, non-limiting, representation of resource mapping for PUCCH resources along with reference signal. The PUCCH resources can be equal to one RB, which can be equal to twelve sub carriers.

Illustrated in FIG. 5 is an example physical resource block 502 with blocks assigned to control channel information 504 and reference signal (e.g., depicted by squares 506, 508, and 510) in accordance with various aspects and embodiments discussed herein. If the network configures a reference signal (either SRS, DMRS for PUSCH or DMRS for other PUCCH formats), indicated by squares 506, 508, and 510, then the network can use this information to decode the PUCCH format 0 signal.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 6:
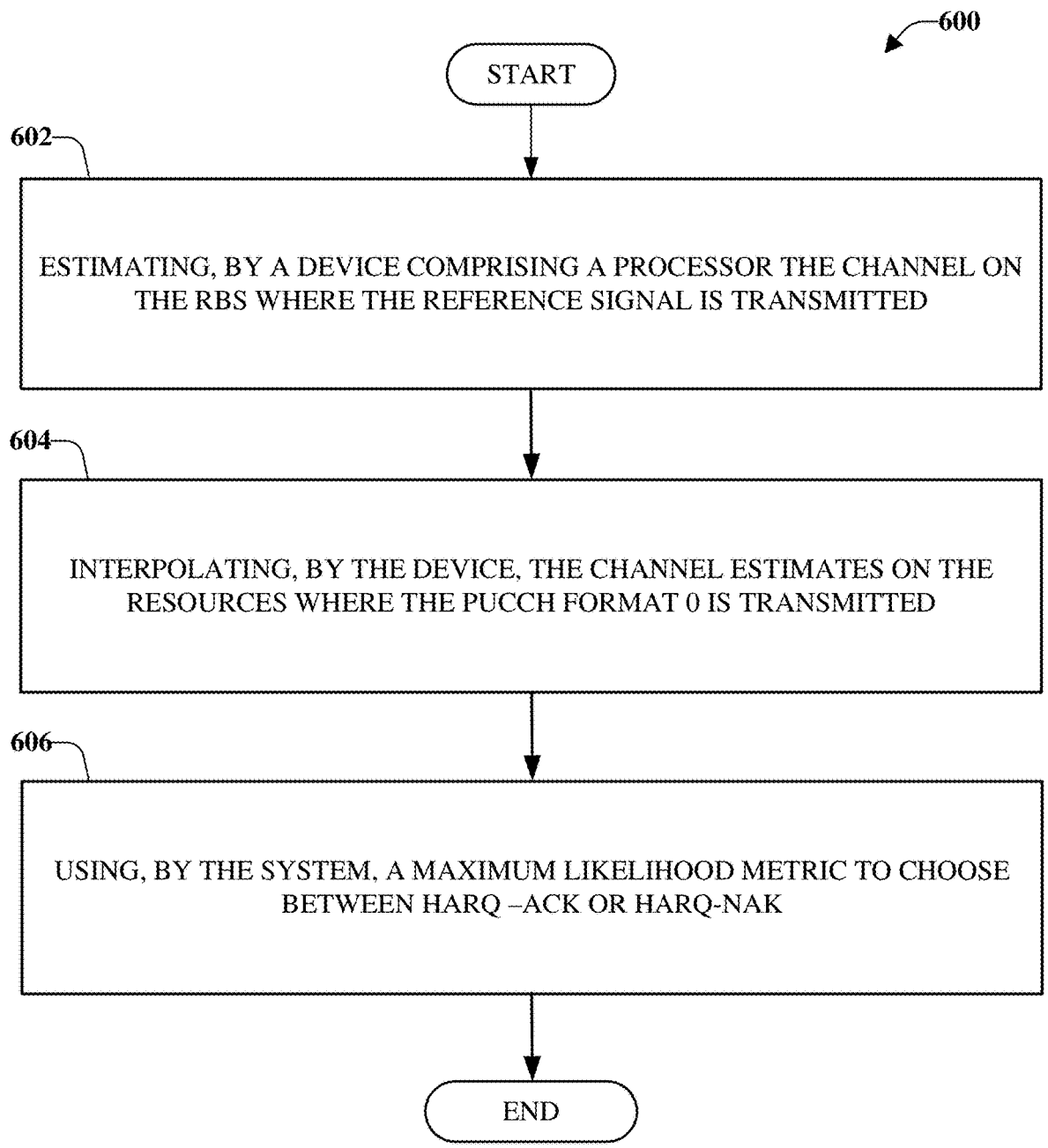
FIG. 6 illustrates a flow diagram of an example, non-limiting, computer-implemented method for determining the hybrid automatic repeat request acknowledgement for advanced networks in accordance with one or more embodiments described herein.

FIG. 6 illustrates a flow diagram of an example, non-limiting, computer-implemented method 600 for determining the HARQ-ACK for advanced networks in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a system operatively coupled to one or more processors, can estimate the channel on the RBS where the reference signal is transmitted. At 604 of the computer-implemented method 600, the system can interpolate the channel estimates on the resources where the PUCCH format 0 is transmitted.

Upon or after the channel estimation of PUCCH resources is completed, at 606 of the computer-implemented method 600, the system can use a maximum likelihood metric to choose between HARQ-ACK or HARQ-NAK. For example, to use the maximum likelihood metric, the following equation can be utilized:

$$z1=\|R-Hx1\|^2$$

$$z2=\|R-Hx2\|^2 \qquad \text{Equation 1.}$$

If z1 is less than z2 (e.g., z1<z2), HARQ-ACK was chosen. If z1 is not less than z2, then HARQ-NACK can be selected. In equation 1, R is the received signal, H is the channel estimated from the reference signal (and interpolated), x1 is the CAZAC sequence corresponding to the HARQ-ACK, and x2 is the CAZAC sequence corresponding to HARQ-NAK.

Figure 7:
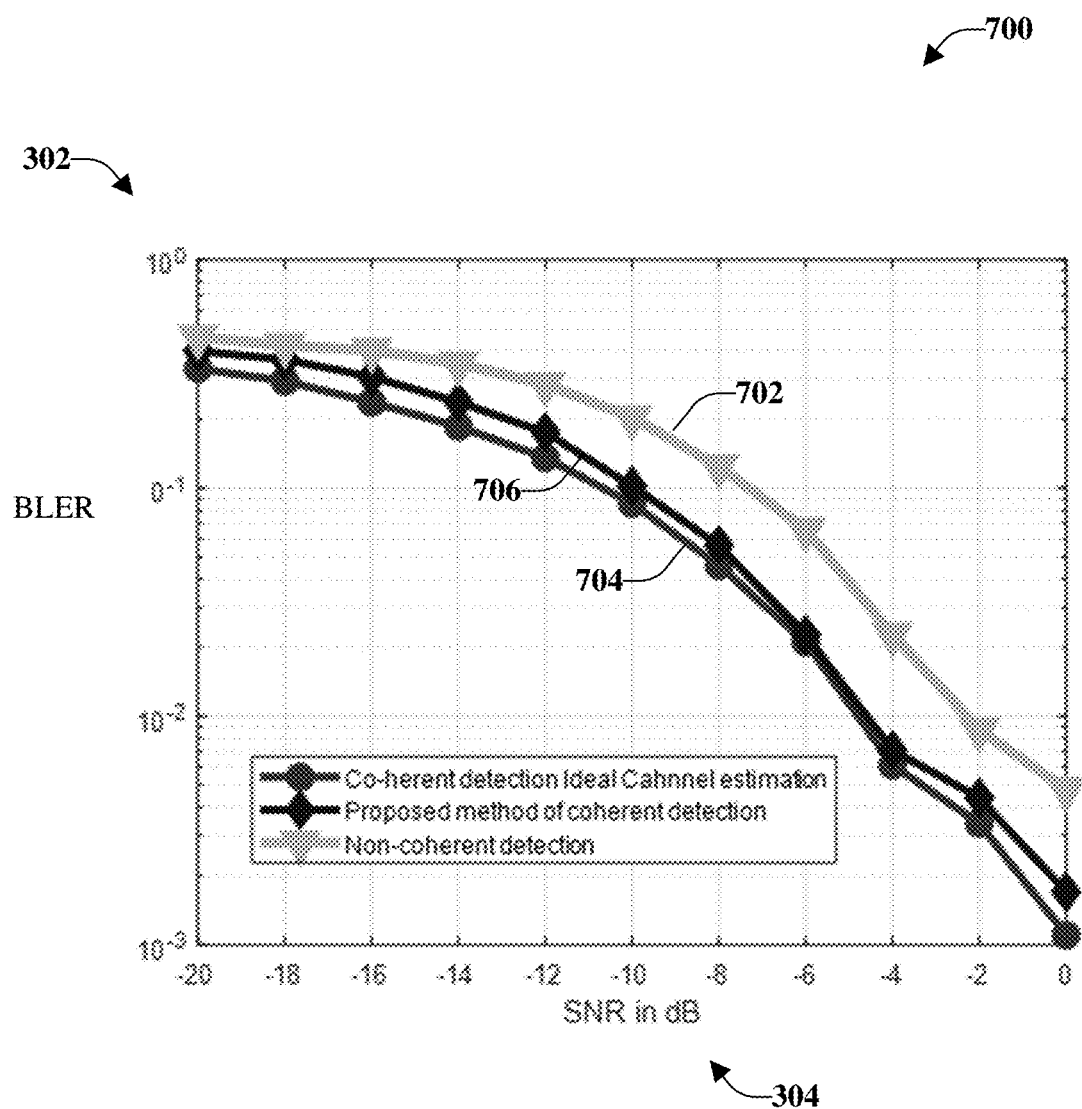
FIG. 7 illustrates an example, non-limiting, chart of block error rate comparison between traditional techniques and techniques in accordance with one or more embodiments described herein.

FIG. 7 illustrates an example, non-limiting, chart 700 of BLER comparison between traditional techniques and techniques in accordance with one or more embodiments described herein. Repetitive description of like elements employed in other embodiments described herein is omitted for sake of brevity.

Illustrated on the vertical axis 302 is BLER, and on the horizontal axis 304 is SNR in decibels (dBs). As illustrated in FIG. 7, the BLER is plotted at various SNRs for a non-coherent detection method 702, and a coherent detection method 704 (e.g., ideal channel estimation). Also illustrated is the proposed method of coherent detection 706, which, as illustrated, is close to the ideal channel estimation. Accordingly, by using the disclosed aspects, an almost 2.5 db SNR gain can be achieved, where the proposed method of coherent detection 706 is around 2.5 dB better than non-coherent detection method 702.

Figure 8:
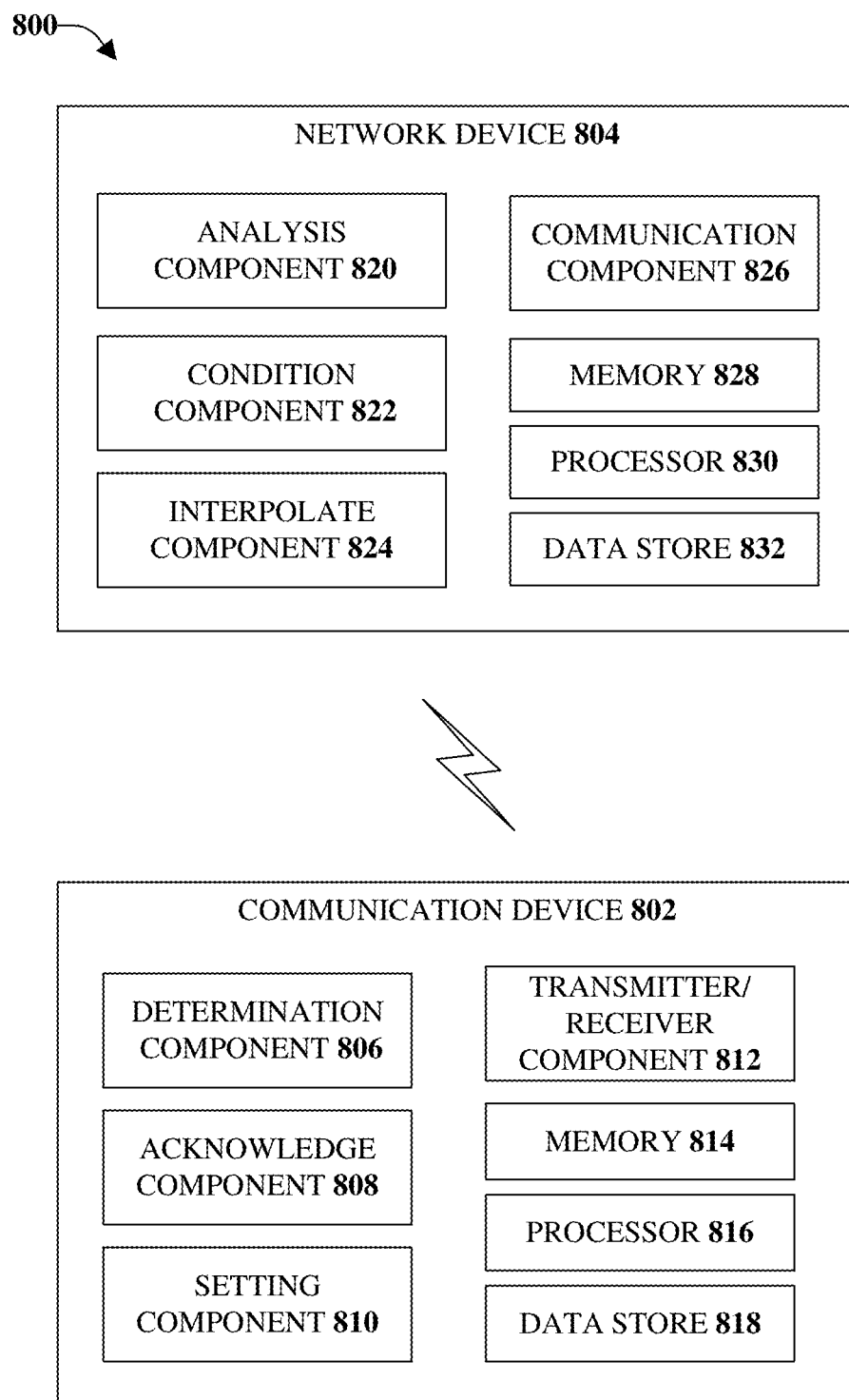
FIG. 8 illustrates an example, non-limiting, system for facilitating decoding of uplink control channels for advanced networks in accordance with one or more embodiments described herein.

FIG. 8 illustrates an example, non-limiting, system 800 for facilitating decoding of uplink control channels for advanced networks in accordance with one or more embodiments described herein. Aspects of systems (e.g., the system 800 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 800 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 800 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 8, the system 800 can include a mobile device 802 and a network device 804. The network device 804 can be included in a group of network devices of a wireless network. Although only a single communication device and a single network device are shown and described, the various aspects are not limited to this implementation. Instead, multiple communication devices and/or multiple network devices can be included in a communications system.

The mobile device 802 can include a determination component 806, an acknowledge component 808, a setting component 810, a transmitter/receiver component 812, at least one memory 814, at least one processor 816, and at least one data store 818. The network device 804 can include an analysis component 820, a condition component 822, an interpolate component 824, a communication component 826, at least one memory 828, at least one processor 830, and at least one data store 832.

The determination component 806 can ascertain that a data transmission received from the network device 804 was received successfully (e.g., via the transmitter/receiver component 812). For example, prior to the determination component 806 ascertaining that the data transmission was received successfully, the mobile device 802 can receive (e.g., via the transmitter/receiver component 812) a physical downlink shared channel from the network device 804.

Based on the data transmission being received successfully, the acknowledge component 808 can prepare an acknowledgement that indicates the data transmission was received. The acknowledgement can be transmitted, by the transmitter/receiver component 812, to the network device 804 in an uplink transmission. The acknowledgement can be associated with a symbol in a first resource block of the uplink transmission.

In addition, the transmitter/receiver component 812 can transmit a reference signal in a second resource block of the uplink transmission. The second resource block can be within a predetermined time and frequency domain proximity to the first resource block.

In an example, the reference signal can be a sounding reference signal. In another example, the reference signal can be a demodulation reference signal. Further, the acknowledgement can be an encoded sequence. The uplink transmission can conform to a physical uplink control channel transmission format that facilitates device multiplexing in a physical resource block and can be based on sequence selection.

According to some implementations, the acknowledge component 808 can determine a hybrid automatic repeat request acknowledgement, from the physical downlink shared channel received from the network device 804. Further to these implementations, the setting component 810 can apply a recommended uplink control channel format setting and a reference signal setting. The recommended uplink control channel format setting and the reference signal setting can be indicated in the physical downlink shared channel received from the network device 804.

With reference now to the network device 804, the analysis component 820 can determine a channel estimate for an uplink control transmission received from the mobile device 802 via an uplink control channel. For example, the analysis component 820 can make the determination based on a reference signal received from the mobile device 802.

Further, the condition component 822 can determine a status of whether the data transmission was received by the mobile device 802. The condition component 822 can determine the status based on the channel estimate and a maximum likelihood estimation function.

For example, the status can be a HARQ-ACK or a HARQ-NACK. Thus, according to an implementation, to determine the status, the condition component 822 can determine a HARQ-ACK was received from the mobile device 802. In accordance with another implementation, the condition component 822 can determine a HARQ-NACK was received from the mobile device 802.

In an example, a first resource block that includes the reference signal can be within a predetermined distance from a second resource block associated with a symbol of the uplink control transmission. Further to this example, the interpolate component 824 can interpolate the channel estimate to the second resource block associated with the symbol.

The reference signal can be associated with an estimation of channel state information associated with the data transmission to the mobile device 802. In an example, the reference signal can be associated with data demodulation.

According to some implementations, the uplink control transmission can conform to a physical uplink control channel transmission format that facilitates mobile device multiplexing in a physical resource block and is based on a sequence selection.

The transmitter/receiver component 812 can be configured to transmit to, and/or receive data from, the network device 804, other network devices, and/or other mobile devices. Through the transmitter/receiver component 812, the mobile device 802 can concurrently transmit and receive data, can transmit and receive data at different times, or combinations thereof. The communication component 826 can be configured to transmit to, and/or receive data from, the mobile device 802, other mobile devices, and/or other network devices. Through the communication component 826, the network device 804 can concurrently transmit and receive data, can transmit and receive data at different times, or combinations thereof.

The at least one memory 814 can be operatively connected to the at least one processor 816. The at least one memory 814 can store executable instructions that, when executed by the at least one processor 816 can facilitate performance of operations. Further, the at least one processor 816 can be utilized to execute computer executable components stored in the at least one memory 814.

For example, the at least one memory 814 can store protocols associated with decoding uplink control channels in advanced networks as discussed herein. Further, the at least one memory 814 can facilitate action to control communication between the mobile device 802, the network device 804, other mobile devices, and/or other network devices, such that the mobile device 802 can employ stored protocols and/or algorithms to achieve improved communications in a wireless network as described herein.

Further, the at least one memory 828 can be operatively connected to the at least one processor 830. The at least one memory 828 can store executable instructions that, when executed by the at least one processor 830 can facilitate performance of operations. Further, the at least one processor 830 can be utilized to execute computer executable components stored in the at least one memory 828.

For example, the at least one memory 828 can store protocols associated with decoding uplink control channels in advanced networks as discussed herein. Further, the at least one memory 828 can facilitate action to control communication between the network device 804, the mobile device 802, other network devices, and/or other mobile devices, such that the network device 804 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 816 can facilitate respective analysis of information related to decoding uplink control channels in advanced networks. The at least one processor 816 can be a processor dedicated to analyzing and/or generating information received, a processor that controls one or more components of the mobile device 802, and/or a processor that both analyzes and generates information received and controls one or more components of the mobile device 802.

In addition, the at least one processor 830 can facilitate respective analysis of information related to decoding uplink control channels in advanced networks. The at least one processor 830 can be a processor dedicated to analyzing and/or generating information received, a processor that controls one or more components of the network device 804, and/or a processor that both analyzes and generates information received and controls one or more components of the network device 804.

Further, the term network device (e.g., network node, network node device) is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 804) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 9:
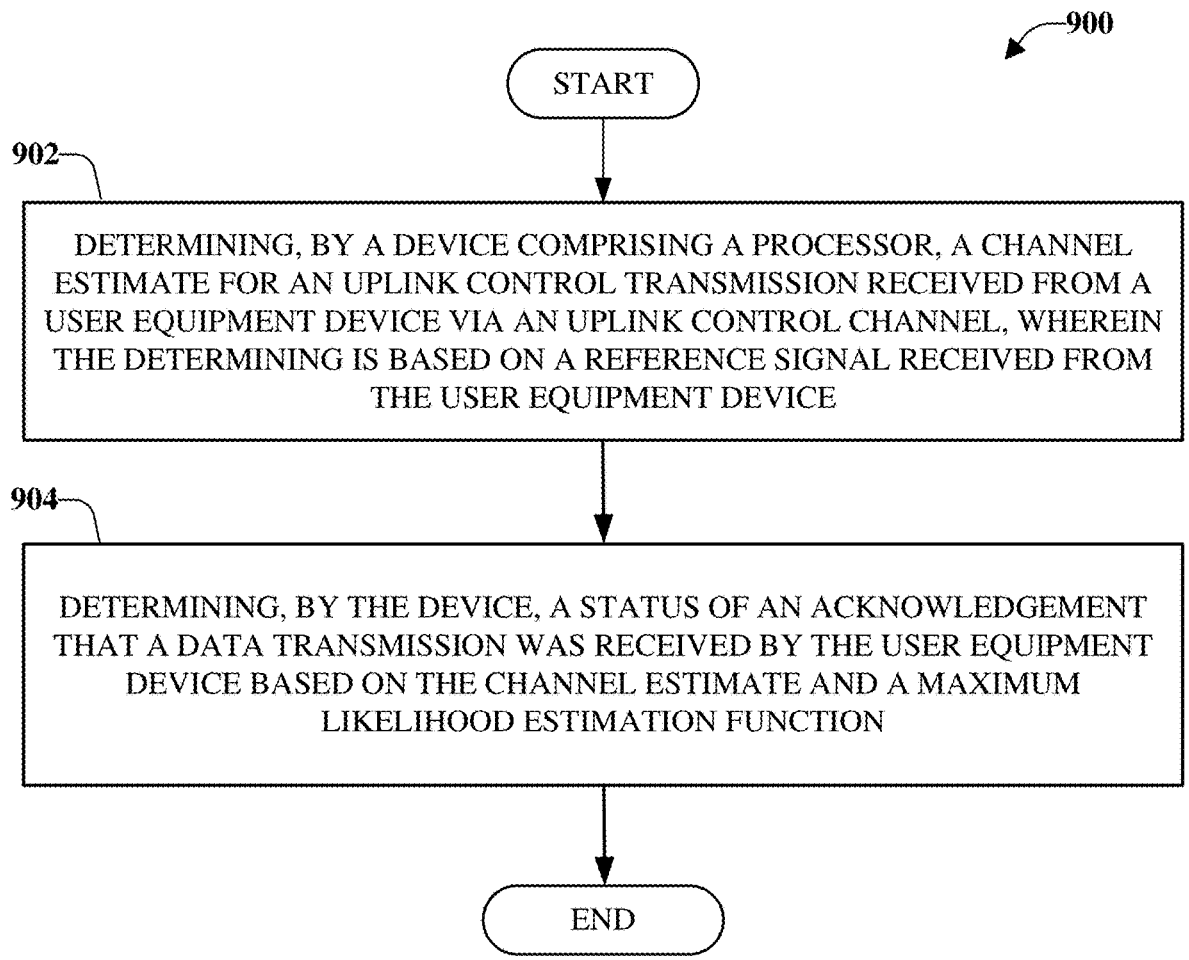
FIG. 9 illustrates a flow diagram of an example, non-limiting, computer-implemented method for facilitating decoding of uplink control channels by a network device for advanced networks in accordance with one or more embodiments described herein.

FIG. 9 illustrates a flow diagram of an example, non-limiting, computer-implemented method 900 for facilitating decoding of uplink control channels by a network device for advanced networks in accordance with one or more embodiments described herein. Repetitive description of like elements employed in other embodiments described herein is omitted for sake of brevity.

In some implementations, a system comprising a processor can perform the computer-implemented method 900 and/or other methods discussed herein. In other implementations, a device comprising a processor can perform the computer-implemented method 900 and/or other methods discussed herein. In other implementations, a machine-readable storage medium, can comprise executable instructions that, when executed by a processor, facilitate performance of operations, which can be the operations discussed with respect to the computer-implemented method 900 and/or other methods discussed herein. In further implementations, a computer readable storage device comprising executable instructions that, in response to execution, cause a system comprising a processor to perform operations, which can be operations discussed with respect to the computer-implemented method 900 and/or other methods discussed herein.

The computer-implemented method 900 starts, at 902, when a device comprising a processor determines a channel estimate for an uplink control transmission received from a user equipment device via an uplink control channel (e.g., via the analysis component 820). The determination can be based on a reference signal received from the user equipment device. The uplink control channel can comprise an uplink control channel configured to operate according to a fifth generation wireless network communication protocol.

According to an implementation, a first resource block that includes the reference signal can be within a predetermined distance from a second resource block associated with a symbol of the uplink control transmission. Further to this implementation, the computer-implemented method 900 also can comprise interpolating the channel estimate to the second resource block associated with the symbol.

Further, at 904 of the computer-implemented method 900, the device can determine a status of an acknowledgement that a data transmission was received by the user equipment device based on the channel estimate and a maximum likelihood estimation function (e.g., via the condition component 822). Determining the status can comprise, according to some implementations, determining a hybrid automatic repeat request acknowledgement was received from the user equipment device. According to another implementation, determining the status of the acknowledgement can comprise determining a hybrid automatic repeat request non-acknowledgement was received from the user equipment device.

In an example, the reference signal can be associated with an estimation of channel state information associated with the data transmission to the user equipment device. According to another example, the reference signal can be associated with data demodulation. Further, the uplink control transmission can conform to a physical uplink control channel transmission format that facilitates user equipment device multiplexing in a physical resource block and can be based on a sequence selection.

Figure 10:
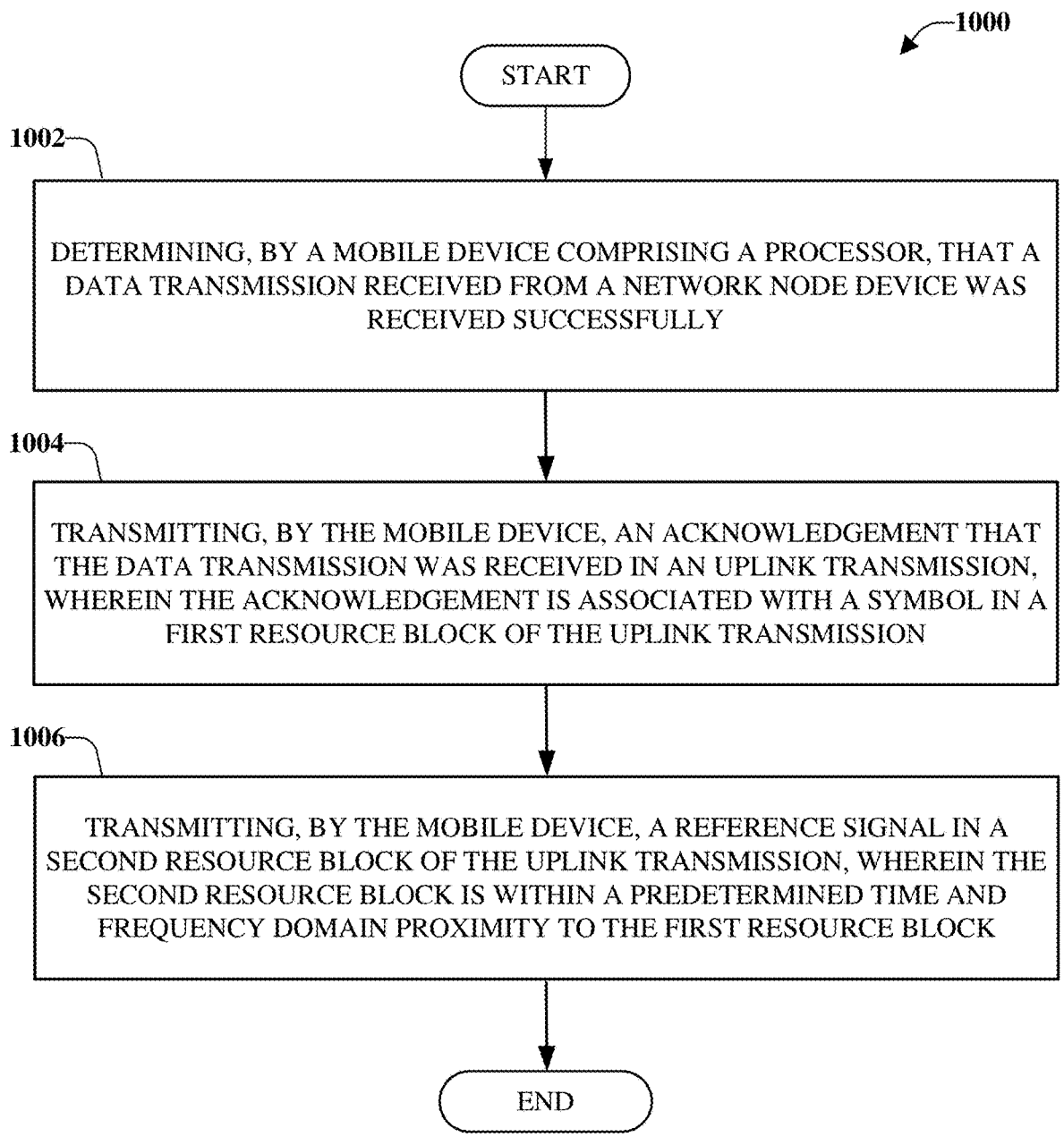
FIG. 10 illustrates a flow diagram of an example, non-limiting, computer-implemented method for facilitating decoding of uplink control channels by a mobile device for advanced networks in accordance with one or more embodiments described herein.

FIG. 10 illustrates a flow diagram of an example, non-limiting, computer-implemented method 1000 for facilitating decoding of uplink control channels by a mobile device for advanced networks in accordance with one or more embodiments described herein. Repetitive description of like elements employed in other embodiments described herein is omitted for sake of brevity.

In some implementations, a system comprising a processor can perform the computer-implemented method 1000, and/or other methods discussed herein. In other implementations, a device comprising a processor can perform the computer-implemented method 1000, and/or other methods discussed herein. In other implementations, a machine-readable storage medium, can comprise executable instructions that, when executed by a processor, facilitate performance of operations, which can be the operations discussed with respect to the computer-implemented method 1000, and/or other methods discussed herein. In further implementations, a computer readable storage device comprising executable instructions that, in response to execution, cause a system comprising a processor to perform operations, which can be operations discussed with respect to the computer-implemented method 1000, and/or other methods discussed herein.

The computer-implemented method 1000 starts, at 1002, when a device comprising a processor determines that a data transmission received from a network node device was received successfully (e.g., via the determination component 806). Further, at 1004, of the computer-implemented method 1000, the device can transmit an acknowledgement that the data transmission was received in an uplink transmission (e.g., via the acknowledge component 808). The acknowledgement can be associated with a symbol in a first resource block of the uplink transmission. According to some implementations, the acknowledgement can be an encoded sequence.

At 1006 of the computer-implemented method 1000, the device can transmit a reference signal in a second resource block of the uplink transmission, wherein the second resource block is within a predetermined time and frequency domain proximity to the first resource block (e.g., via the transmitter/receiver component 812). According to an implementation, the reference signal can be a sounding reference signal. In another implementation, the reference signal can be a demodulation reference signal.

The uplink transmission can conform to a physical uplink control channel transmission format that facilitates device multiplexing in a physical resource block and is based on sequence selection. Additionally, transmitting the reference signal can comprise transmitting the reference signal in an uplink control channel configured to operate according to a fifth generation wireless network communication protocol.

According to some implementations, the computer-implemented method 1000 can comprise, prior to determining that the data transmission was received successfully, receiving, by the mobile device, a physical downlink shared channel from the network node device. Further, the mobile device can determine a hybrid automatic repeat request acknowledgement, from the physical downlink shared channel In addition, the mobile device can apply a recommended uplink control channel format setting and a reference signal setting indicated in the physical downlink shared channel received from the network node device.

Figure 11:
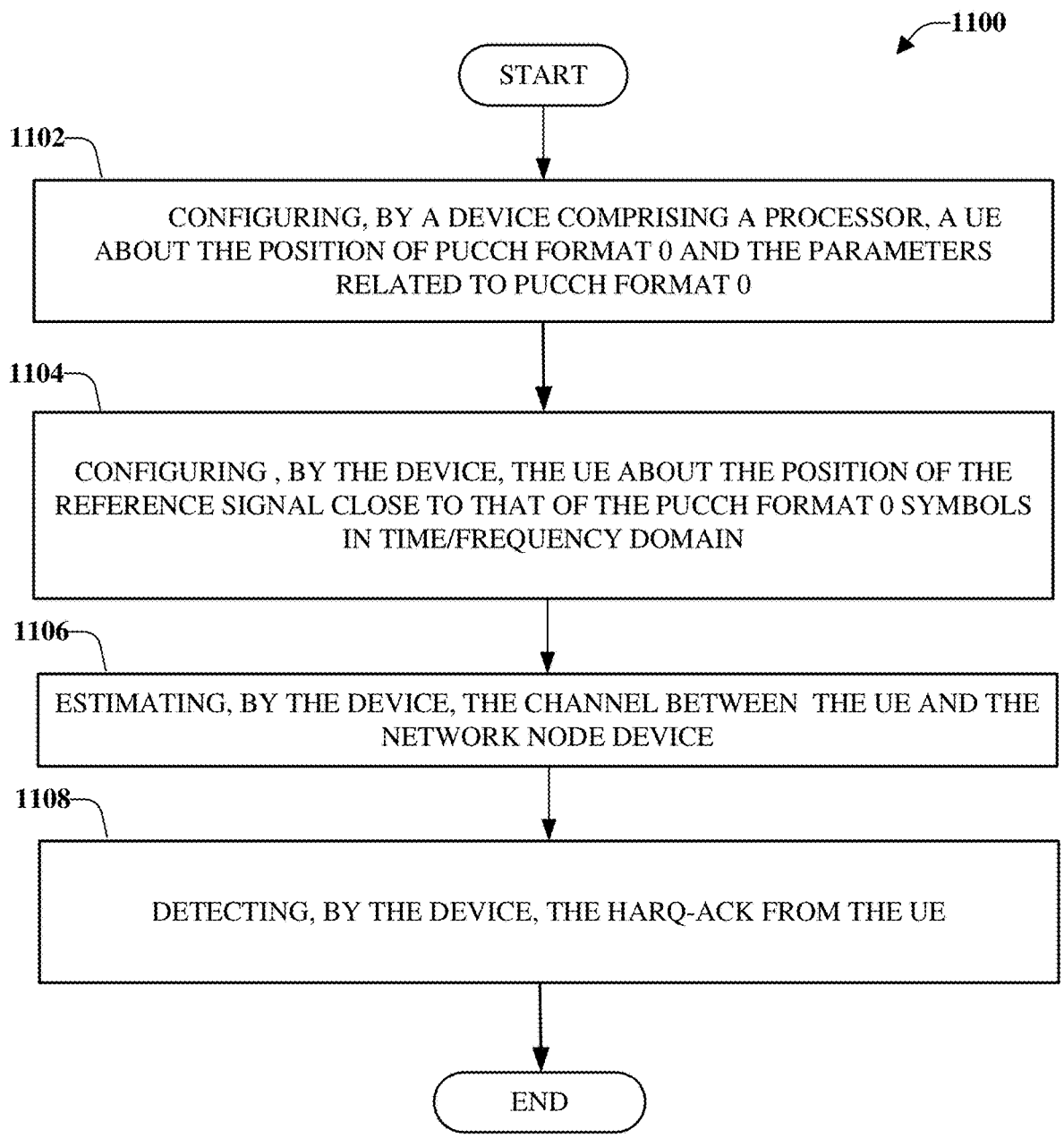
FIG. 11 illustrates a flow diagram of an example, non-limiting, computer-implemented method implemented at a network node device for improving the performance of a physical uplink control channel format 0 for advanced networks in accordance with one or more embodiments described herein.

FIG. 11 illustrates a flow diagram of an example, non-limiting, computer-implemented method 1100 implemented at a network node device for improving the performance of a physical uplink control channel format 0 for advanced networks in accordance with one or more embodiments described herein. Repetitive description of like elements employed in other embodiments described herein is omitted for sake of brevity.

In some implementations, a system comprising a processor can perform the computer-implemented method 1100, and/or other methods discussed herein. In other implementations, a device comprising a processor can perform the computer-implemented method 1100, and/or other methods discussed herein. In other implementations, a machine-readable storage medium, can comprise executable instructions that, when executed by a processor, facilitate performance of operations, which can be the operations discussed with respect to the computer-implemented method 1100, and/or other methods discussed herein. In further implementations, a computer readable storage device comprising executable instructions that, in response to execution, cause a system comprising a processor to perform operations, which can be operations discussed with respect to the computer-implemented method 1100, and/or other methods discussed herein.

The computer-implemented method 1100 starts, at 1102, when a device comprising a processor, configures a UE about the position of PUCCH format 0 and the parameters related to PUCCH format 0. At 1104 of the computer-implemented method 1100 the device can configure the UE about the position of the reference signal close to that of the PUCCH format 0 symbols in time/frequency domain. The device can, at 1106 of the computer-implemented method 1100, estimate the channel between the UE and the network node device. Further, at 1108, the device can detect the HARQ-ACK from the UE.

Figure 12:
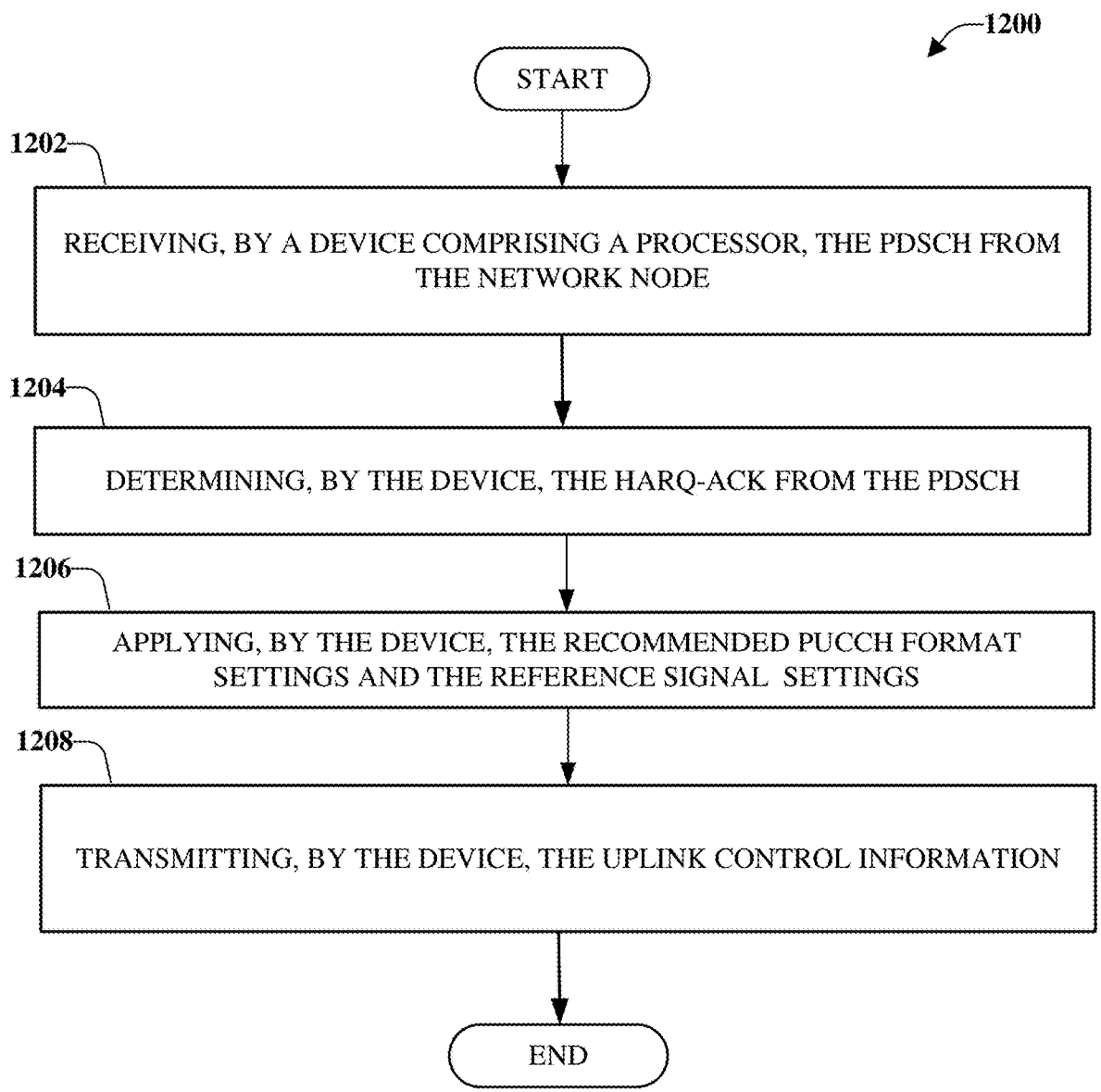
FIG. 12 illustrates a flow diagram of an example, non-limiting, computer-implemented method implemented at a mobile device for transmitting hybrid automatic repeat request acknowledgement and reference signal to the network device for advanced networks in accordance with one or more embodiments described herein.

FIG. 12 illustrates a flow diagram of an example, non-limiting, computer-implemented method 1200 implemented at a mobile device for transmitting HARQ-ACK and reference signal to the network device (e.g., gNB) for advanced networks in accordance with one or more embodiments described herein. Repetitive description of like elements employed in other embodiments described herein is omitted for sake of brevity.

In some implementations, a system comprising a processor can perform the computer-implemented method 1200, and/or other methods discussed herein. In other implementations, a device comprising a processor can perform the computer-implemented method 1200, and/or other methods discussed herein. In other implementations, a machine-readable storage medium, can comprise executable instructions that, when executed by a processor, facilitate performance of operations, which can be the operations discussed with respect to the computer-implemented method 1200, and/or other methods discussed herein. In further implementations, a computer readable storage device comprising executable instructions that, in response to execution, cause a system comprising a processor to perform operations, which can be operations discussed with respect to the computer-implemented method 1200, and/or other methods discussed herein.

At 1202 of the computer-implemented method 1200, a device can receive a PSCH from the network node device. At 1204, the device can determine the HARQ-ACK from the PDSCH. The recommended PUCCH format settings and the reference signal settings can be applied by the device at 1206 of the computer-implemented method 1200. Further, at 1208, the device can transmit the uplink control information.

The various aspects discussed herein can allow for better detection capability for uplink control channel. This can achieve significant gain in block error rate for PUCCH format 0. Further, this in turn improves the NR coverage which allows for a robust performance of the UL control channel even at low SINR conditions.

Described herein are systems, methods, articles of manufacture, and other embodiments or implementations that can facilitate decoding uplink control channels in advanced networks. Facilitating decoding of uplink control channels for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)).

In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used and it refers to any type of network node serving UE and/or connected to other network nodes or network elements or any radio node from where a UE receives signal. Examples of radio network nodes are Node B, Base Station (BS), Multi-Standard Radio (MSR) radio node such as MSR BS, gNodeB, eNode B, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS) etc. system.

Cloud Radio Access Networks (cRAN) can enable the implementation of concepts such as Software-Defined Network (SDN) and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 13:
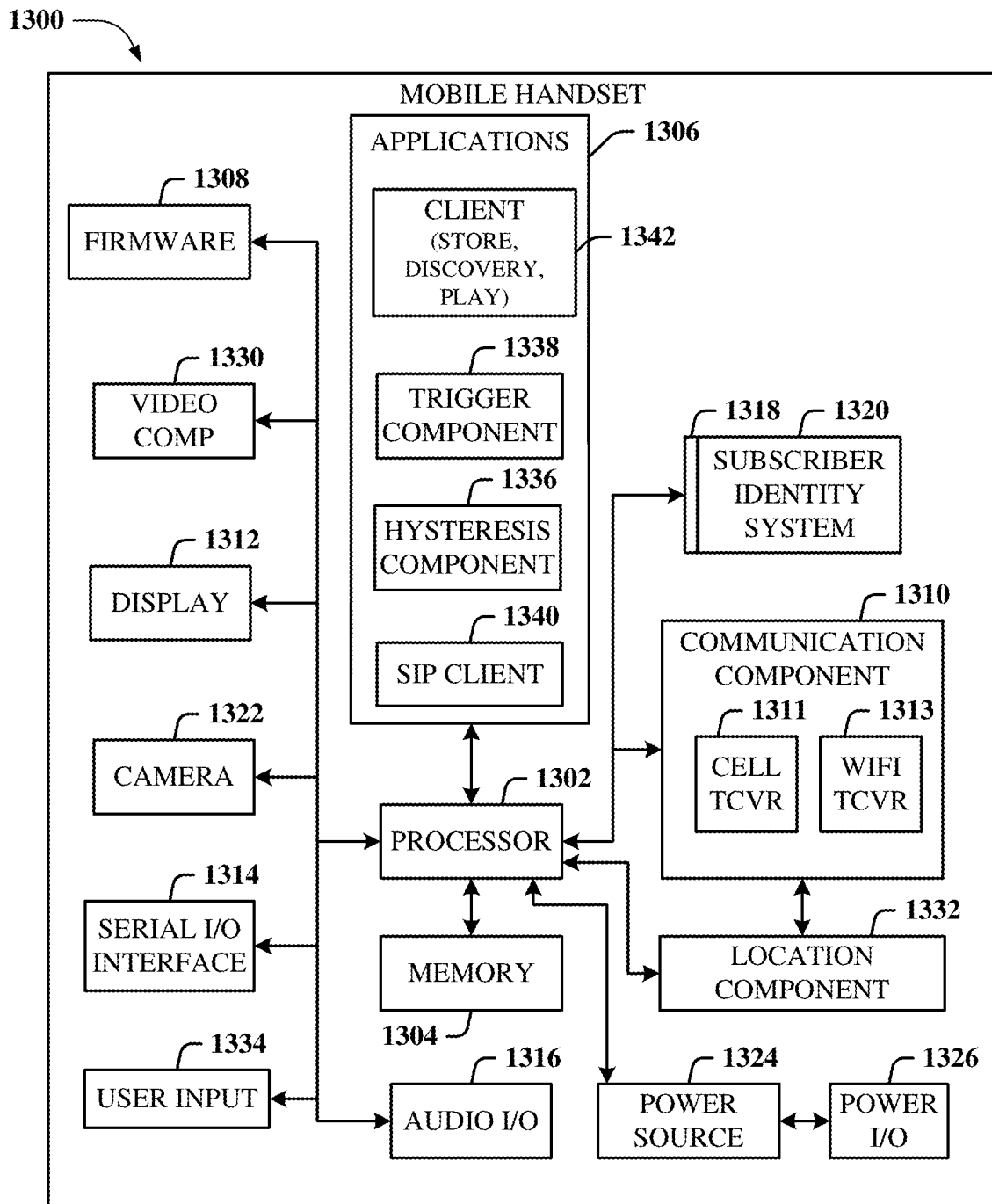
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor

1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touchscreen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
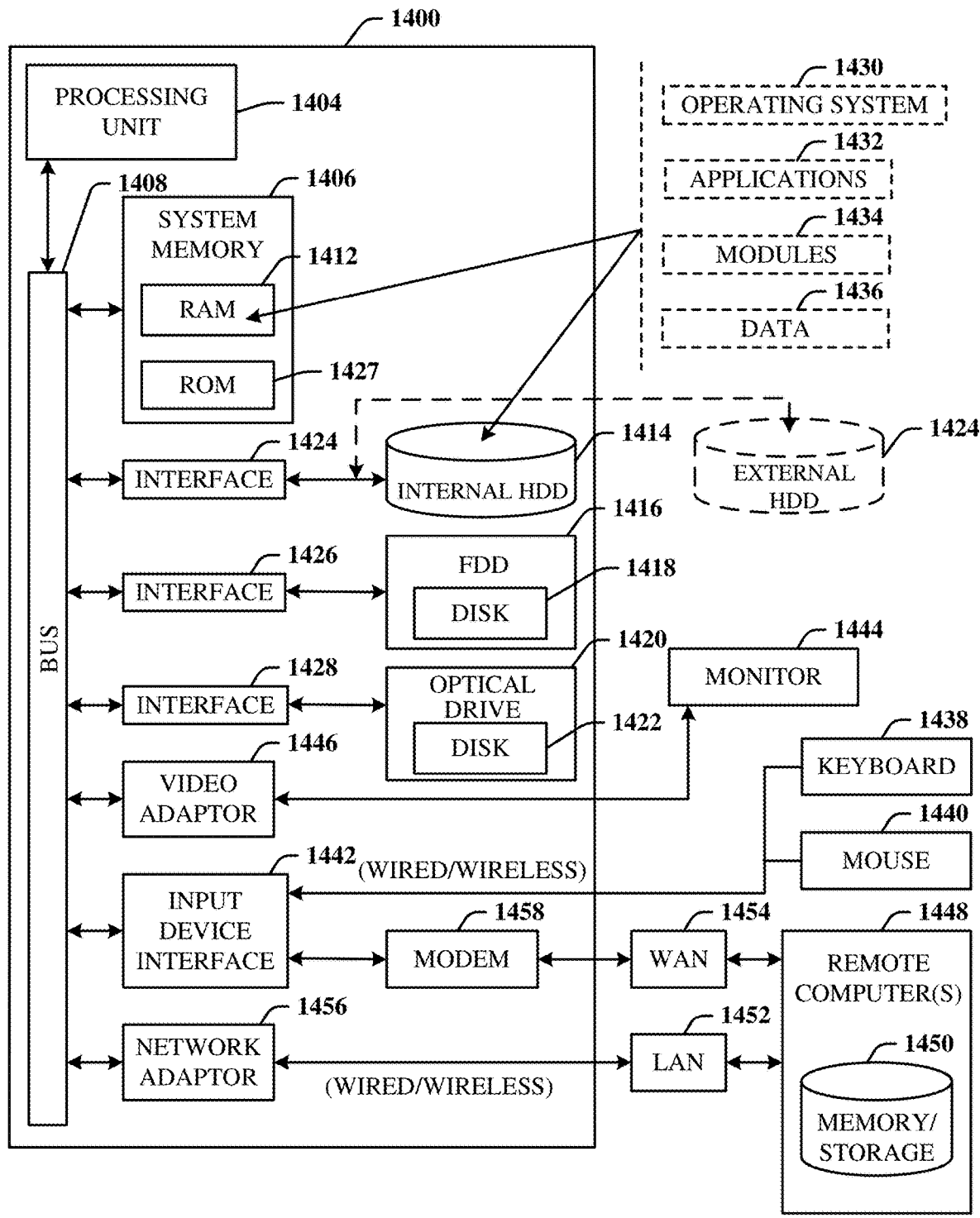
FIG. 14 illustrates an example block diagram of an example computer operable to engage in a system architecture that facilitates wireless communications according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the end-user device can include a computer 1400, the computer 1400 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1440. Other input devices (not shown) can include a microphone, an IR remote control, a joystick, a game pad, a stylus pen, touchscreen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer 1400 typically includes other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/storage device 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 6G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A network node, comprising:
   a processor; and
   a memory that stores executable instructions that, when executed by the processor, facilitate performance of operations, comprising:
      configuring a user equipment with first information indicative of a first position of an uplink control channel format 0, parameters associated with the uplink control channel format 0, and second information indicative of a second position of a reference signal that is within a predetermined proximity to symbols of the uplink control channel format 0;
      determining a channel estimate for an uplink control transmission received from the user equipment via the uplink control channel format 0, wherein the determining is based on the reference signal received from the user equipment; and
      determining a status of an acknowledgement that a data transmission was received by the user equipment based on the channel estimate and a maximum likelihood estimation function, wherein the status is a hybrid automatic repeat request acknowledgement or a hybrid automatic repeat request non-acknowledgement, and wherein a first resource block comprising the reference signal is within a predetermined distance from a second resource block associated with a symbol of the uplink control transmission; and
      interpolating the channel estimate to the second resource block associated with the symbol, wherein the uplink control channel format 0 comprises an uplink control channel configured to operate according to a fifth generation communication protocol.

2. The network node of claim 1 wherein the determining of the status comprises determining the hybrid automatic repeat request acknowledgement was received from the user equipment.

3. The network node of claim 1 wherein the determining of the status comprises determining the hybrid automatic repeat request non-acknowledgement was received from the user equipment.

4. The network node of claim 1, wherein the reference signal is associated with an estimation of channel state information associated with the data transmission to the user equipment.

5. The network node of claim 1, wherein the reference signal is associated with data demodulation.

6. The network node of claim 1, wherein the uplink control transmission conforms to a physical uplink control channel transmission format that facilitates user equipment multiplexing in a physical resource block and is based on a sequence selection.

7. A method, comprising:
   determining, by user equipment comprising a processor, that a data transmission received from network equipment was received successfully, wherein the user equipment is configured with first information indicative of a first position of an uplink control channel format 0, parameters associated with the uplink control channel format 0, and second information indicative of a second position of a reference signal that is within a predetermined proximity to symbols of the uplink control channel format 0;
   transmitting, by the user equipment, an hybrid automatic repeat request acknowledgement that the data transmission was received in an uplink transmission, wherein the hybrid automatic repeat request acknowledgement is associated with a symbol in a first resource block of the uplink transmission; and
   transmitting, by the user equipment, the reference signal in a second resource block of the uplink transmission, wherein the second resource block is within a predetermined distance from time and frequency domain proximity to the first resource block, wherein the uplink transmission is a control channel format 0, and wherein a channel estimate determined from the reference signal is interpolated to the first resource block associated with the symbol, wherein the transmitting of the reference signal comprises transmitting the reference signal in an uplink control channel configured to operate according to a fifth generation communication protocol.

8. The method of claim 7, further comprising:
   prior to the determining, receiving, by the user equipment, a physical downlink shared channel from the network equipment;
   determining, by the user equipment, the hybrid automatic repeat request acknowledgement, from the physical downlink shared channel; and
   applying, by the user equipment, a recommended uplink control channel format setting and a reference signal setting indicated in the physical downlink shared channel received from the network equipment.

9. The method of claim 7, wherein the reference signal is a sounding reference signal.

10. The method of claim 7, wherein the reference signal is a demodulation reference signal.

11. The method of claim 7, wherein the hybrid automatic repeat request acknowledgement is an encoded sequence.

12. The method of claim 7, wherein the uplink transmission conforms to a physical uplink control channel transmission format that facilitates device multiplexing in a physical resource block and is based on sequence selection.

13. A non-transitory machine-readable medium, comprising executable instructions that, when executed by a processor of a user equipment, facilitate performance of operations, comprising:
   determining a hybrid automatic repeat request acknowledgement based on a successful receipt of a data transmitted via a physical downlink shared channel received from network equipment, wherein the user equipment is configured with first information indicative of a first position of an uplink control channel format 0, parameters associated with the uplink control channel format 0, and second information indicative of a second position of a reference signal that is within a predetermined proximity to symbols of the uplink control channel format 0;

applying a recommended physical uplink control channel format setting and a reference signal setting based on the physical downlink shared channel received from the network equipment; and transmitting uplink control information via the uplink control channel format 0 using the recommended physical uplink control channel format setting and the reference signal setting, wherein the uplink control information comprises the hybrid automatic repeat request acknowledgement associated with a symbol in a first resource block of an uplink transmission and the reference signal in a second resource block of the uplink transmission, wherein the second resource block is within a predetermined distance from the first resource block, wherein a channel estimate determined from the reference signal is interpolated to the first resource block associated with the symbol, and wherein the transmitting of the reference signal comprises transmitting the reference signal in an uplink control channel configured to operate according to a fifth generation communication protocol.

14. The non-transitory machine-readable medium of claim 13, wherein the reference signal setting comprises a sounding reference signal.

15. The non-transitory machine-readable medium of claim 13, wherein the reference signal setting comprises a demodulation reference signal.

16. The non-transitory machine-readable medium of claim 13, wherein the transmitting comprises transmitting an uplink transmission that conforms to a physical uplink control channel transmission format that facilitates device multiplexing in a physical resource block and is based on sequence selection.

17. The non-transitory machine-readable medium of claim 13, wherein the transmitting comprises transmitting the uplink control information via an uplink control channel configured to operate according to the fifth generation communication protocol.

18. The non-transitory machine-readable medium of claim 13, wherein the physical downlink shared channel is received from the network equipment via a downlink control channel configured to operate according to the fifth generation communication protocol.

* * * * *